United States Patent
Frey et al.

(10) Patent No.: US 9,580,573 B2
(45) Date of Patent: *Feb. 28, 2017

(54) MIXTURES CONTAINING TRIMELLITIC ACID ESTER AND POLYETHER POLYOL ESTER AS PLASTICIZERS, USE OF THE MIXTURES FOR PRODUCING POLYMER COMPOUNDS AND PVC MATERIALS CONTAINING SAID MIXTURES

(71) Applicant: Oxea GmbH, Oberhausen (DE)

(72) Inventors: Guido D. Frey, Riedstadt (DE); Horst Lange, Bochum (DE); Heinz Strutz, Moers (DE); Jacco de Haas, Krefeld (DE)

(73) Assignee: OXEA GMBH, Oberhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,628

(22) Filed: Sep. 28, 2015

(65) Prior Publication Data

US 2016/0017120 A1    Jan. 21, 2016

Related U.S. Application Data

(63) Continuation of application No. 14/391,431, filed as application No. PCT/EP2013/001655 on Jun. 5, 2013, now Pat. No. 9,193,844.

(30) Foreign Application Priority Data

Jun. 29, 2012   (DE) .................. 10 2012 012 942
Jun. 5, 2013    (WO) .............. PCT/EP2013/001655

(51) Int. Cl.
| | |
|---|---|
| C08F 20/56 | (2006.01) |
| C08K 5/00 | (2006.01) |
| B32B 17/10 | (2006.01) |
| C08K 5/12 | (2006.01) |
| C08K 5/103 | (2006.01) |
| C08L 71/02 | (2006.01) |

(52) U.S. Cl.
CPC .............. C08K 5/12 (2013.01); C08K 5/0016 (2013.01); C08K 5/103 (2013.01); C08L 71/02 (2013.01)

(58) Field of Classification Search
None
See application file for complete search history.

(56) References Cited

U.S. PATENT DOCUMENTS

| | | | |
|---|---|---|---|
| 2006/0135665 | A1 | 6/2006 | Hansel et al. |
| 2008/0306190 | A1 | 12/2008 | Weiss et al. |
| 2011/0087044 | A1 | 4/2011 | Weber et al. |
| 2011/0087045 | A1 | 4/2011 | Adamzik et al. |
| 2011/0241254 | A1 | 10/2011 | Hardouin-Duparc et al. |
| 2012/0190883 | A1 | 7/2012 | Frey et al. |

FOREIGN PATENT DOCUMENTS

| | | |
|---|---|---|
| CN | 101993548 A | 3/2011 |
| DE | 102009048771 A1 | 4/2011 |
| DE | 102009048772 A1 | 4/2011 |
| DE | 102009048775 A1 | 4/2011 |
| EP | 1672013 A1 | 6/2006 |
| EP | 1983024 A1 | 10/2008 |
| JP | 50078637 A | 6/1975 |
| WO | 2007101968 A2 | 9/2007 |
| WO | 2007144831 A2 | 12/2007 |
| WO | 2012075164 A2 | 6/2012 |

OTHER PUBLICATIONS

M. Ittershagen, "Phthalates—Useful Plasticizers with Undesired Properties", Feb. 2007 status report of the Federal Environment Agency of the Federal Ministry for the Environment, Nature Conservation and Nuclear Safety of the Federal Republic of Germany, pp. 1-23.
Ullmann's Encyclopedia of Industrial Chemistry, 6th edition, 2003, pp. 219-220, vol. 27, Wiley-VCH, Weinheinn.
Weissermel and Arpe, Industrielle Organische Chemie, 3rd edition, 1988, pp. 159 to 162 and 294 to 295, VCH, Federal Republic of Germany.

*Primary Examiner* — Susannah Chung
*Assistant Examiner* — Robert T Butcher
(74) *Attorney, Agent, or Firm* — Michael W. Ferrell

(57) ABSTRACT

A mixture useful as plasticizer comprises trimellitic esters and polyether polyol esters, characterized in that the mixture comprises from 1 to 99% by weight of trimellitic esters and 99 to 1% by weight of polyether polyol esters, wherein the polyether polyol esters can be derived from linear or branched, aliphatic monocarboxylic acids having 3 to 20 carbon atoms in the molecule.

11 Claims, No Drawings

MIXTURES CONTAINING TRIMELLITIC ACID ESTER AND POLYETHER POLYOL ESTER AS PLASTICIZERS, USE OF THE MIXTURES FOR PRODUCING POLYMER COMPOUNDS AND PVC MATERIALS CONTAINING SAID MIXTURES

CLAIM FOR PRIORITY

This is a continuation application of U.S. patent application Ser. No. 14/391,431, filed Oct. 9, 2014, now U.S. Pat. No. 9,193,844. U.S. patent application Ser. No. 14/391,431, now U.S. Pat. No. 9,193,844, was a national phase application of PCT/EP2013/001655 FILED Jun. 5, 2013 which was based on application DE 10 2012 012 942.4 FILED Jun. 29, 2012. The priorities of U.S. patent application Ser. No. 14/391,431, PCT/EP2013/001655 and DE 10 2012 012 942.4 are hereby claimed and their disclosures incorporated herein by reference.

TECHNICAL FIELD

The present invention relates to mixtures comprising trimellitic esters and polyether polyol esters as plasticizers, to use of the mixtures for production of polymer compounds and to PVC materials comprising this mixture.

BACKGROUND

For production of semifinished products and finished products from polyvinyl chloride, plasticizers are used on a large scale, these typically being combined with the polymer pellets during a mixing and heating operation according to the prior art, such that the polymer pellets either dissolve in the plasticizer or the plasticizer is absorbed by the polymer pellets. The polymer plasticized in this way is then processed further by extrusion or other forming techniques to give semifinished products or finished products. A comprehensive description of the prior art can be found, for example, in C. E. Wilkes, J. W. Summers, C. A. Daniels; "PVC Handbook", Hanser-Verlag 2005. The efficiency of the plasticizers is typically measured by the processing properties that they permit during compounding and by the physicochemical properties of the material after processing. Important properties are, for example, low volatility during processing to give the compound, rapid diffusion capacity into the polymer matrix, good thermal stability with a view to resistance to decomposition or discoloration, and a good profile of mechanical properties, in which a favourable combination of breaking strength, hardness and bending strength is typically required. In addition, favourable low-temperature properties may be called for if the material is used to produce, for example, mouldings which are used in cryotechnology, for example. Further demands with regard to the toxicological properties of the processing aids used may also be made on materials which are used in contact with food and drink, in medical technology, or else for production of children's toys.

Phthalic esters which have been used for some time as plasticizers impart a favourable performance profile to the PVC materials with low production costs, and these are therefore counted among the universal plasticizers. These include, for example, dioctyl phthalate (DOP), diisononyl phthalate (DINP) or else diisodecyl phthalate (DIDP). With specific plasticizers, however, it is possible to influence certain desirable properties, for example low-temperature bending resistance or impact resistance, thermal stability, fire resistance or migration resistance. These specialty plasticizers include, for example, the esters of mono- or tribasic aromatic carboxylic acids or di- or polybasic aliphatic carboxylic acids.

It is additionally known that universal plasticizers can be processed in combination with what are called extenders in order to reduce the manufacturing costs of PVC component production. The extenders used are, for example, naphtha-based hydrocarbons, aliphatic hydrocarbons or else chlorinated hydrocarbons, the latter additionally exerting a flame-retarding effect. Such extenders generally have only limited compatibility with the PVC polymer matrix and have a tendency to migrate out of the moulding in the course of ageing processes or to separate from the polymer matrix in the moulding. The result is generally unwanted release to the environment, and also an unwanted reduction in the mechanical properties of the moulding, which is generally manifested in the form of embrittlement.

However, not only the extenders result in unwanted separation and migration out of the PVC component; the primary plasticizers also exhibit a more or less marked migration tendency which can lead to unwanted degradation of the material properties in the course of component ageing.

The group of the phthalic esters which have been used over a long period as plasticizers in the PVC-processing industry, the protagonist of which can be regarded as dioctyl phthalate, has additionally long been the subject of intensive toxicological studies, since it is suspected that they can adversely affect the human hormone system as what are called endocrine disruptors. The possible influence thereof on human health has led to intensive, controversial discussions which ended, for example, in bans from regulators on the use of dioctyl phthalate in soft toys for infants. Various phthalates have likewise been removed from formulations for cosmetic applications (cf., for example: M. Ittershagen, "Phthalates—Useful Plasticizers with undesired Properties", 2007 status report of the Federal Environment Agency of the Federal Ministry for the Environment, Nature Conservation and Nuclear Safety of the Federal Republic of Germany). The discussion about the influence of migrating plasticizers on the environment and on human health, but also the long-term fitness for use of PVC articles, has led to a broad interest in migration-resistant, phthalate-free plasticizers.

There has therefore been a constant major interest in industry in plasticizers having a favourable combination of processing properties during compounding and moulding production, such as good heat, migration and elution resistance, which allow development of specific product properties such as favourable low-temperature properties and additionally have a favourable toxicological profile.

In order to achieve a balanced profile of properties for the plasticizer used, mixtures of various primary plasticizers are also used. WO 2007/144831 A2 discloses flexible hoses for the transport of liquid food and drink. In order to ensure sufficient flexibility of the hose on the one hand but to minimize the migration of the auxiliaries into the food and drink on the other hand, mixtures of trimellitates and adipates or mixtures of monomeric and polymeric adipates, for example, are used as plasticizers. According to WO 2012/075164 A2, PVC plastisol is processed by the spraying technique to give soft PVC articles, the plasticizer used being a mixture of trimellitates and a second plasticizer such as adipates or sebacates.

EP 1 672 013 A1 discloses ester mixtures comprising a mixture of esterification products of polyether polyols and aromatic monocarboxylic acids and aliphatic monocarboxylic acids. In addition, tri(2-ethylhexyl)trimellitate may also be present as a further plasticizer.

EP 1 983 024 A1 discloses ester mixtures comprising alkylbenzyl esters of aromatic tri- and tetracarboxylic acids and polybenzyl esters of aromatic tri- and tetracarboxylic acids. Trioctyl trimellitate may also be present as a further plasticizer. WO 2007/101968 A2 relates to PVC compositions plasticized with trioctyl trimellitate.

The known trimellitic ester-containing plasticizer mixtures are not necessarily the optimal solution in each case for the required field of use of the plastic article, and so there is a constant demand for improved plasticizer mixtures.

It has been found that, surprisingly, such a profile of demands can be fulfilled by mixtures of trimellitic esters and polyether polyol esters.

SUMMARY OF INVENTION

The present invention therefore relates to a mixture comprising trimellitic esters and polyether polyol esters, characterized in that the mixture comprises from 1 to 99% by weight of trimellitic esters and 99 to 1% by weight of polyether polyol esters, wherein the polyether polyol esters can be derived from linear or branched, aliphatic monocarboxylic acids having 3 to 20 carbon atoms in the molecule.

The mixture preferably comprises 10 to 90% by weight of trimellitic esters and 90 to 10% by weight of polyether polyol esters. Most preferably, the mixture comprises 40 to 60% by weight of trimellitic esters and 60 to 40% by weight of polyether polyol esters.

DETAILED DESCRIPTION

The term "mixture" is understood to mean the plasticizer mixture comprising trimellitic esters and polyether polyol esters, and optionally further plasticizers such as adipic esters, sebacic esters, azelaic esters or polyesters. Preferably, however, the mixture consists exclusively of the trimellitic ester and the polyether polyol ester.

Trimellitic esters are understood to mean, for example, tri(2-ethylhexyl)trimellitate, tri(n-octyl, n-decyl)trimellitate, tri(heptyl, nonyl)trimellitate, tri(n-octyl)trimellitate, tri(isononyl)trimellitate or tri(isodecyl)trimellitate and mixtures thereof. More preferably, the mixture comprises tri(2-ethylhexyl)trimellitate. The preparation of trimellitic esters is conducted on the industrial scale (Ullmann's Encyclopedia of Industrial Chemistry, Wiley-VCH, 6th edition, 2003, Vol. 27, pages 219-220).

Polyether polyol esters contain ether diols as the alcohol component, for example diethylene glycol, triethylene glycol, tetraethylene glycol, higher polyethylene glycols, propylene 1,2-glycol or higher propylene glycols. They are prepared by reaction of the ether diol and acid, optionally in the presence of acidic catalysts. The preparation thereof is described, for example, in DE 102009048771 A1, DE 102009048772 A1 and DE 102009048775 A1.

Among the ether diols, suitable ether diols are particularly those which satisfy the general formula (I)

H—(-O—[-CR$^1$R$^2$—]$_m$-)$_o$—OH  (I)

in which R$^1$ and R$^2$ are each independently hydrogen, an alkyl radical having 1 to 5 carbon atoms, preferably methyl, ethyl or propyl, m is an integer from 1 to 10, preferably 1 to 8 and especially 1, 2, 3 or 4, o is an integer from 2 to 15, preferably 2 to 8 and especially 2, 3, 4 or 5.

Suitable ether diols are di-, tri- and tetraethylene glycol or dipropylene glycol, tripropylene glycol or tetrapropylene glycol. The preparation thereof is known, for example, from Weissermel, Arpe, Industrielle Organische Chemie, VCH 1988, 3rd edition, pages 159 to 162; pages 294 to 295.

The ether diols are esterified with linear or branched, aliphatic monocarboxylic acids having 3 to 20 carbon atoms in the molecule to give polyether polyol esters. Examples of aliphatic monocarboxylic acids as base units of the polyether polyol esters are propionic acid, n-butyric acid, isobutyric acid, n-pentanoic acid, 2-methylbutyric acid, 3-methylbutyric acid, 2-methylpentanoic acid, n-hexanoic acid, 2-ethylbutyric acid, n-heptanoic acid, 2-methylhexanoic acid, cyclohexanecarboxylic acid, 2-ethylhexanoic acid, n-nonanoic acid, 2-methyloctanoic acid, isononanoic acid, 3,5,5-tri-methylhexanoic acid, 2-propylheptanoic acid, 2-methylundecanoic acid, isoundecanecarboxylic acid, tricyclodecanecarboxylic acid and isotridecanecarboxylic acid.

Particularly suitable polyether polyol esters have been found to be triethylene glycol di-2-ethylhexanoate, tetraethylene glycol di-n-heptanoate, triethylene glycol di-2-ethylbutyrate, triethylene glycol di-n-heptanoate or tetraethylene glycol di-2-ethylhexanoate.

In a particularly preferred embodiment, the mixture comprises triethylene glycol di-2-ethylhexanoate as the polyether polyol ester.

Thus, even small amounts of polyether polyol esters added to trimellitic esters are sufficient to lower the relatively high viscosity of the trimellitic esters and hence to facilitate compounding into the polymer compound, preferably into the PVC matrix. Unexpectedly, the migration tendency of the substance mixture remains at the favourable, very low level of the trimellitic esters, which is manifested in favourable elution characteristics, low volatility during thermal exposure and favourable mechanical properties of the polymer compound.

A very particularly suitable plasticizer mixture has been found to be a mixture consisting of tri(2-ethylhexyl)trimellitate and triethylene glycol di-2-ethylhexanoate. Through the choice of the mixing ratio, it is possible to adjust the viscosity of the mixture to the required value in a controlled manner, in order to facilitate the processing of the polymer compound. For a mixture consisting of tri(2-ethylhexyl)trimellitate and triethylene glycol di-2-ethylhexanoate, the following viscosity values are determined at 20° C.:

| Tri(2-ethylhexyl) trimellitate content in the overall mixture | |
|---|---|
| m [%] | η viscosity of the mixture [mm$^2$/s] |
| 0 | 16.9 |
| 10.91 | 20.2 |
| 16.53 | 27.3 |
| 42.17 | 38.7 |
| 50 | 47.728 |
| 51 | 49.63 |
| 64.05 | 71.2 |
| 74 | 100.9 |
| 79.68 | 124 |
| 84 | 147.63 |
| 84.5 | 149.9 |
| 100 | 297.6 |

As well as the mixture, further additives known per se to those skilled in the art are used for the production of polymer compounds, such as lubricants, stabilizers, antioxidants and fillers. The polymer compounds produced using the inventive plasticizer mixture may especially be PVC compounds, from which PVC materials can additionally be manufactured.

The concept of the invention is illustrated hereinafter by a description of the production of PVC compounds based on an industrial standard outline formulation, using mixtures of tri(2-ethylhexyl)trimellitate and triethylene glycol di-2-ethylhexanoate in two different concentrations in each case, but this is not intended to define a particularly preferred embodiment.

Formulation Composition R-1

|  | Sample I-1 Content | Sample I-2 Content |
|---|---|---|
| Vinnolit S 4170 PVC | 100 | 100 |
| Mixture A | 50 | 67 |
| Omya BSH calcium carbonate | 30 | 30 |
| Drapex 39 soya oil | 5 | 5 |
| Baerostab UBZ 780 | 2 | 2 |

Mixture A consists of a mixture of 51% by weight of tri(2-ethylhexyl)trimellitate and 49% by weight of triethylene glycol di-2-ethylhexanoate.

Formulation Composition R-2

Composition as in R-1, except using a mixture of 84.5% by weight of tri(2-ethylhexyl)trimellitate and 15.5% by weight of triethylene glycol di-2-ethyl-hexanoat (mixture B).

All polymer blends were produced with an FML 10/KM23 heating/cooling mixer from Reimelt Henschel Mischsysteme. The processed blends could be processed without any problem on a twin-screw extruder (working temperature 140-160° C.) with flat film draw (machine type CR 72T, from Dr. Collin) to give films of width 100 mm and thickness 0.3 to 1.2 mm.

By hot pressing (press type P 300 P/M, from Dr. Collin), sheets having the dimensions 145×145×3 mm were produced from the films, from which specimens for tensile testing were punched out.

The films obtained were characterized using the following tests:

| | |
|---|---|
| Hardness to ASTM D2240 | Standard Test for Rubber Property Durometer Hardness |
| Tensile strength to ASTM D638 | Standard Test Method for Tensile Properties of Plastics |
| Stiffness to ASTM D1043 | Standard Test Method for Stiffness Properties of Plastics as a Function of Temperature by Means of a Torsion Test |
| Chemical resistance to ASTM D1239 | Standard Test Method for Resistance of Plastic Films to Extraction by Chemicals. The extraction media used were soapy water and oil. |
| Test for volatiles to ASTM D2369 | Standard Test Method for Volatile Content of Coatings |
| Fogging number to DIN 75201 | |

Migration characteristics in the course of hot storage over 7 days/100° C. based on DIN 53508

Comparative Examples

As control experiments in each case, analogous formulations except with 100% tri(2-ethylhexyl)trimellitate, R-3, and with 100% triethylene glycol di-2-ethylhexanoate, R-4, were produced and processed.

The results are compiled in Table 1:

TABLE 1

Performance characteristics of the PVC specimens plasticized with formulations R-1 to R-4; content of 50 phr ester mixture

| | R-1 | R-2 | R-3 | R-4 |
|---|---|---|---|---|
| Hardness (Shore A) | 83 | 84 | 88 | 81 |
| Tensile strength (MPa) | 18.9 | 19.0 | 12.8 | 16.2 |
| Glass transition temperature ° C. | −37 | −24 | −20 | −58 |
| Extraction resistance | | | | |
| white oil | 3.0 | 1.2 | 10 | 10 |
| 1% soapy water | 1.2 | 0.4 | 0.1 | 3 |
| Fogging number*) | 71 | 84 | 97 | 34 |
| Loss of mass in the course of hot storage 7 d/100° C. (%) | 4.4 | 1.9 | 1.1 | 6.5 |

*)The fogging number was determined to DIN 75201 on a compound having a content of 67 phr ester mixture.

What is claimed is:

1. A mixture comprising trimellitic esters and polyether polyol ester, characterized in that the mixture comprises from more than 84.5% up to 99% by weight of trimellitic esters and 1% up to less than 15.5% by weight of a polyether polyol ester, wherein the polyether polyol ester is triethylene glycol di-2-ethylhexanoate and further characterized in that trimellitic esters are selected from tri(2-ethylhexyl) trimellitate, tri(n-octyl, n-decyl) trimellitate, tri(heptyl, nonyl) trimellitate, tri(n-octyl) trimellitate, tri(isononyl) trimellitate, tri(isodecyl) trimellitate or mixtures thereof.

2. A mixture according to claim 1, characterized in that the mixture consists of tri(2-ethylhexyl) trimellitate and triethylene glycol di-2-ethylhexanoate.

3. A mixture according to claim 1, characterized in that the mixture has a viscosity of <300 mm$^2$/s at 20° C. and <80 mm$^2$/s at 40° C.

4. PVC materials comprising the mixture according to claim 1, characterized in that the PVC materials have a glass transition temperature of <20° C.

5. PVC materials comprising the mixture according to claim 1, characterized in that the PVC materials have a fogging number of at least 60.

6. A method of using the mixture according to claim 1 comprising incorporating the mixture into polymer compositions comprising a polymer and the mixture, said compositions having a Shore A hardness of <90.

7. A method of using the mixture according to claim 1 comprising incorporating the mixture into a product selected from the group consisting of: polymer compounds; masterbatches; semifinished products and finished products.

8. The method according to claim 7, wherein the product comprises PVC.

9. The method according to claim 8, wherein the mixture consists of tri(2-ethylhexyl) trimellitate and triethylene glycol di-2-ethylhexanoate.

10. A product comprising PVC and provided with a mixture comprising from more than 84.5% up to 99% by weight of trimellitic esters and 1% up to less than 15.5% by weight of a polyether polyol ester, wherein the polyether polyol ester is triethylene glycol di-2-ethylhexanoate, wherein the trimellitic esters are selected from tri(2-ethylhexyl) trimellitate, tri(n-octyl, n-decyl) trimellitate, tri(heptyl, nonyl) trimellitate, tri(n-octyl) trimellitate, tri(isononyl) trimellitate, tri(isodecyl) trimellitate or mixtures thereof.

11. The product according to claim 10, characterized in that the mixture consists of tri(2-ethylhexyl) trimellitate and triethylene glycol di-2-ethylhexanoate.

* * * * *